United States Patent [19]
Pak et al.

[11] Patent Number: 5,782,081
[45] Date of Patent: Jul. 21, 1998

[54] HYDROGEN-OXYGEN BURNING TURBINE PLANT

[75] Inventors: Pyong Sik Pak, 10-3-1404, Dogashiba 2-chome, Tennoji-ku, Osaka-shi, Osaka-fu 543; Toru Takigawa, Tokyo; Hidetaka Mori, Takasago; Kiichiro Ogawa, Tokyo, all of Japan

[73] Assignees: Pyong Sik Pak; Yutaka Suzuki, both of Osaka-fu; Mitsubishi Jukogyo Kabushiki Kaisha, Tokyo, all of Japan

[21] Appl. No.: 950,811

[22] Filed: Oct. 29, 1997

Related U.S. Application Data

[63] Continuation of Ser. No. 779,660, Jan. 7, 1997, abandoned, which is a continuation of Ser. No. 492,107, filed as PCT/JP94/00878 May 31, 1994, abandoned.

[51] Int. Cl.$^6$ .................................................. F02C 6/18
[52] U.S. Cl. ................................... 60/39.181; 60/39.52
[58] Field of Search ........................... 60/39.17, 39.181, 60/39.182, 39.465, 39.52

[56] References Cited

U.S. PATENT DOCUMENTS

| | | | |
|---|---|---|---|
| 4,148,185 | 4/1979 | Somers | 60/39.17 |
| 4,204,401 | 5/1980 | Earnest | 60/39.181 |
| 5,331,806 | 7/1994 | Warkentin | 60/39.52 |
| 5,435,123 | 7/1995 | Scholl | 60/39.52 |

FOREIGN PATENT DOCUMENTS

| | | |
|---|---|---|
| 48-36533 | 5/1973 | Japan . |
| 56-4725 | 1/1981 | Japan . |
| 56-50104 | 11/1981 | Japan . |

OTHER PUBLICATIONS

Abstracts of Japan, JP5-296010(A), M-1560, Feb. 15, 1994, vol. 18, No. 90.
H. Jericha, A New Combined Gas Stream Cycle Promising Up to 60% Thermal . . . , Cimac 1985 (Congress International Des Machines A Combustion), pp. 789-810.
Herbert Jericha et al., Towards A Solar-Hydrogen System, 1991 Asme Cogen-Turbo Igti-vol. 6, pp. 435-442.
H. Jericha et al., A Novel Thermal Peak Power Plant, Asme Cogen-Turbo, 3rd International Symposium of Turbomachinery Combined Cycle Technology and Cogeneration Nice, 1989, pp. 59-64.
H Jericha, Efficient Steam Cycle With Internal Combustion Of . . . , Int. J. Hydrogen Energy, vol. 12, No. 5, 1987, pp. 345-354.

*Primary Examiner*—Louis J. Casaregola

[57] ABSTRACT

An object of the present invention is to transfer all of the exhaust heat from the topping gas turbine cycle and thereby improve the overall efficiency (i.e., the efficiency of the topping cycle plus bottoming cycle).

The present invention provides a hydrogen-oxygen burning turbine plant which comprises a closed-loop gas turbine cycle including a compressor 2, a hydrogen-oxygen combustor 21 and a turbine 3 and constituting a topping cycle, an exhaust gas boiler (or heat exchanger) 5 installed between the turbine outlet and the compressor inlet of this gas turbine cycle, and a bottoming cycle including an expansion turbine 6, a hydrogen-oxygen combustor 8, a condensing turbine 9 and a steam condenser 11, all of the exhaust heat from the gas turbine cycle being transferred to the bottoming cycle by means of the exhaust gas boiler, the steam that is the combustion product of the gas turbine cycle being extracted from the system at the inlet or outlet of the exhaust gas boiler 5 and conducted to a condensing turbine 22 or 9.

1 Claim, 2 Drawing Sheets

HYDROGEN-OXYGEN BURNING TURBINE PLANT

This application is a continuation, of application Ser. No. 08/779,660 filed on Jan. 7, 1997, now abandoned; which is a Rule 62 Continuation of Ser. No. 08/492,107, filed as PCT/JP94/00878 May 31, 1994 (abandoned).

TECHNICAL FIELD

This invention relates to a turbine plant using hydrogen as fuel and pure oxygen as oxidizing agent.

BACKGROUND ART

FIG. 2 illustrates a conventional open-cycle turbine plant in which the topping gas turbine cycle uses a fossil fuel as fuel and air as oxidizing agent.

Specifically, in FIG. 2, reference numeral 1 designates a combustor where a fossil fuel and air from a compressor 2 are fed and burned. The resulting combustion gas is introduced into a turbine 3 where it does work to drive a generator 4. The exhaust gas from the turbine is passed through a heat exchanger (in this case, an exhaust gas boiler 5) and then discharged into the atmosphere.

On the other hand, in the bottoming cycle to which the exhaust heat from the gas turbine cycle is transferred through the medium of exhaust gas boiler 5, superheated steam is generated in exhaust gas boiler 5 and then expanded in an expansion turbine 6 to drive a generator 7. The expanded steam is reheated to high temperature by a hydrogen-oxygen combustor 8 and expanded again in a condensing turbine 9 to drive a generator 10. The expanded steam is condensed in a steam condenser 11, and the resulting condensate is pressurized with a feed water pump 12 and supplied to exhaust gas boiler 5 as feed water.

However, since the topping gas turbine cycle of the above-described conventional turbine plant is an open cycle taking in atmospheric air and discharging the exhaust gas into the atmosphere, all of the exhaust heat from the gas turbine cycle cannot be transferred to the bottoming cycle. That is, because of the open-cycle construction, the energy (sensible heat) possessed by the outlet exhaust gas from the exhaust gas boiler is not utilized effectively, so that there has been much waste from the viewpoint of thermal efficiency.

DISCLOSURE OF THE INVENTION

The present invention has been made to solve this problem of the prior art and it is an object thereof to provide a turbine plant in which all of the exhaust heat from the topping gas turbine cycle can be transferred to the bottoming cycle so as to improve the overall efficiency (i.e., the efficiency of the topping cycle plus bottoming cycle).

In order to solve the above-described problem, the present invention provides a turbine plant using hydrogen as fuel and pure oxygen as oxidizing agent which comprises a closed-loop gas turbine cycle including a compressor, a hydrogen-oxygen combustor and a turbine and constituting a topping cycle, a heat exchanger installed between the turbine outlet and the compressor inlet of this gas turbine cycle, and a bottoming cycle including an expansion turbine, a hydrogen-oxygen combustor, a condensing turbine and a steam condenser, all of the exhaust heat from the gas turbine cycle being transferred to the bottoming cycle by means of the heat exchanger, the steam that is the combustion product of the gas turbine cycle being extracted from the system at the inlet or outlet of the heat exchanger and conducted to a condensing turbine.

Since the above-described means of the present invention permits the inlet temperature of the compressor to be chosen at will owing to the closed-loop construction of the topping cycle, the outlet gas temperature of the heat exchanger can be made equal to the inlet gas temperature of the compressor. That is, all of the exhaust heat of the gas turbine cycle can be transferred to the bottoming cycle.

Moreover, additional power can be obtained by allowing the steam that is the combustion product of the topping cycle to expand in a condensing turbine. This brings about an improvement in output and thermal efficiency. In addition, since the gas turbine cycle forms a closed loop, the inlet pressure level of this condensing turbine can basically be chosen at will, thus increasing the degree of freedom of choice of the condensing turbine output.

As described above, in the turbine plant of the present invention using hydrogen as fuel and pure oxygen as oxidizing agent, all of the exhaust heat from the topping cycle can be transferred to the bottoming cycle by converting the topping cycle into a closed loop. Thus, the overall efficiency (i.e., the efficiency of the topping cycle plus bottoming cycle) is improved. Moreover, additional power can be obtained by extracting the steam that is the combustion product of the topping cycle from the closed loop and allowing it to expand in a condensing turbine. Thus, the overall efficiency is further improved.

BEST MODE FOR CARRYING OUT THE INVENTION

Figure 1:
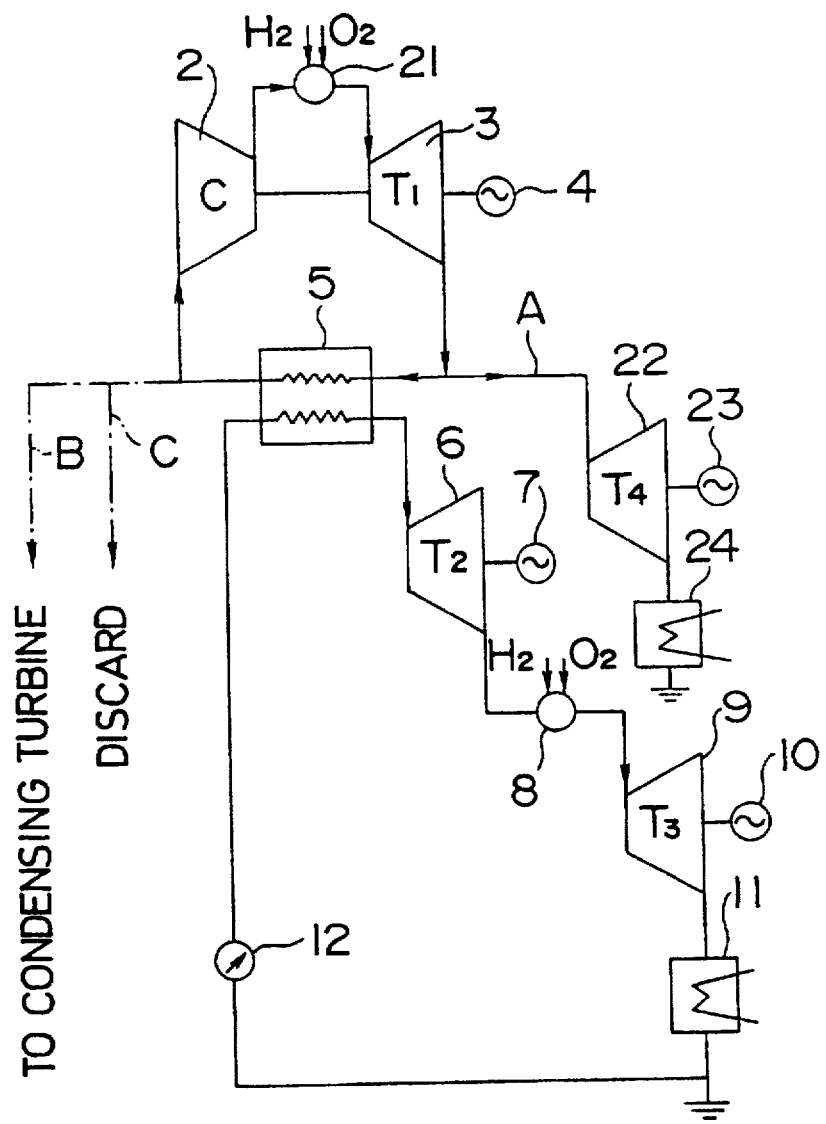
FIG. 1 is a schematic diagram illustrating a hydrogen-oxygen burning turbine plant in accordance with one embodiment of the present invention.
Figure 2:
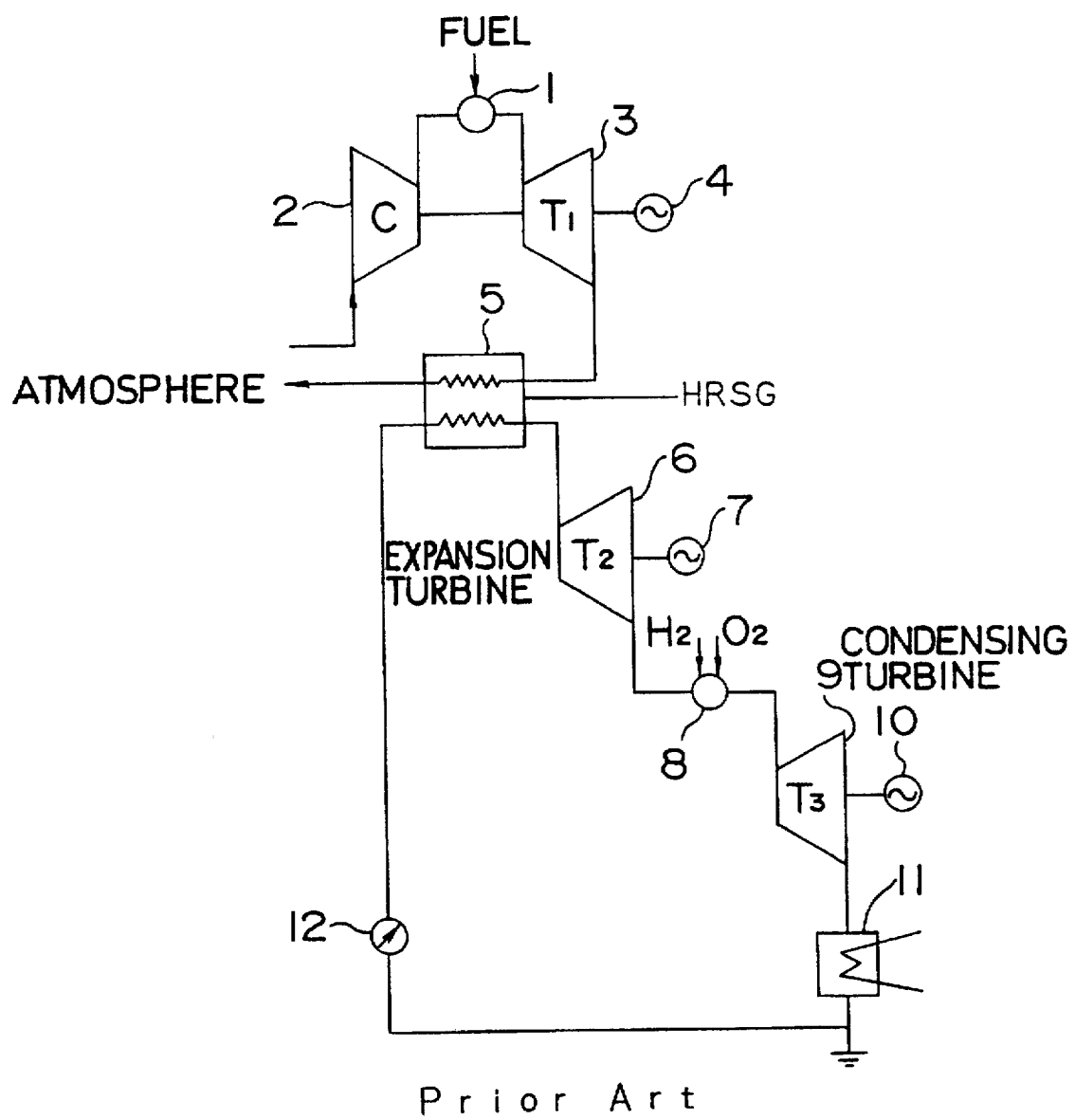
FIG. 2 is a schematic diagram illustrating a conventional turbine plant.

One embodiment of the present invention is specifically described hereinbelow with reference to FIG. 1. FIG. 1 is a schematic diagram illustrating a hydrogen-oxygen burning turbine plant in accordance with one embodiment of the present invention. In this figure, the same parts as shown in FIG. 2 are designated by the same reference numerals and no repeated explanation thereof is given herein.

As shown in FIG. 1, the turbine plant of the present invention is constructed so that the combustor in the topping gas turbine cycle comprises a hydrogen-oxygen combustor 21 and this gas turbine cycle forms a closed loop. Hydrogen used as fuel and oxygen used as oxidizing agent enter the system at the hydrogen-oxygen combustor 21 of this gas turbine cycle and react to produce steam. This steam is extracted from the system at the inlet or outlet (in this embodiment, the inlet) of exhaust gas boiler 5 and conducted to a condensing turbine 22 where it is expanded to drive a generator 23. The exhaust steam from condensing turbine 22 is introduced into a steam condenser 24 where it is condensed to water.

Since the above-described arrangement permits the inlet temperature of compressor 2 to be chosen at will owing to the closed-loop construction of the topping cycle, the outlet gas temperature of exhaust gas boiler 5 can be made equal to the inlet gas temperature of compressor 2. That is, all of the exhaust heat from the gas turbine cycle can be transferred to the bottoming cycle. Thus, the overall efficiency (i.e., the efficiency of the topping cycle plus bottoming cycle) is improved. Generally, the efficiency of such a combined cycle is expressed by the following equation.

$\eta_{C/C} = \eta_{G/T} + \eta_{BOT} \times \eta_{BOILER} \times (-\eta_{G/T})$ where $\eta_{C/C}$ is the efficiency of the combined cycle, $\eta_{G/T}$ is the efficiency of the gas turbine cycle, $\eta_{BOT}$ is the efficiency of the bottoming cycle, and $\eta_{BOILER}$ is the efficiency of the boiler.

Then, an open cycle gives an ordinary $\eta_{BOILER}$ value of about 0.8, whereas a closed cycle gives a $\eta_{BOILER}$ value of 1.0. As a result, the overall efficiency (i.e., the efficiency of the combined cycle) is improved.

Moreover, additional power can be obtained by allowing the steam that is the combustion product of the topping cycle to expand in condensing turbine 22. This brings about an improvement in output and thermal efficiency. In addition, since the gas turbine cycle forms a closed loop, the inlet pressure level of this condensing turbine 22 can basically be chosen at will, thus increasing the degree of freedom of choice of the condensing turbine output.

Furthermore, generally in a hydrogen-oxygen burning turbine plant, the topping and bottoming cycles are organically coupled to each other and a high level of accuracy in combustion control is required, as a result of exaggerated importance attached to high efficiency. Thus, it is expected that difficulties may be encountered in the operation (including start-up) and control of the turbine plant. In the present invention, however, the topping and bottoming cycles can be operated in a more or less separate manner, resulting in the ease of operation from this point of view.

It is to be understood that the condensing turbine 22 shown in FIG. 1 need not necessarily be an independent condensing turbine. If the requirements are met, it is also possible to use the condensing turbine 9 of the bottoming cycle concurrently for that purpose.

In the embodiment illustrated in FIG. 1, the steam that is the combustion product of the gas turbine cycle is extracted from the system at the inlet (or upstream side) of exhaust gas boiler 5 (this case will hereinafter be referred to as Example 1 and represented by A). However, as shown by an alternate long and short dash line, the steam may also be extracted from the system at the outlet (or downstream side) of exhaust gas boiler 5 and conducted to a condensing turbine (this case will hereinafter be referred to as Example 2 and represented by B).

Nevertheless, if consideration is given to the system efficiency, the wetness of the outlet steam from the condensing turbine, and the like, Example 1 is superior to Example 2. The results of some trial calculations of their efficiencies η are shown in Table 1 below, together with that of Comparative Example (i.e., the case in which the exhaust steam from the topping cycle is not utilized, as shown by a two-dot chain line and represented by C).

In Table 1, $L_1$ is the output of gas turbine 3, $L_2$ is the output of expansion turbine 6, $L_3$ is the output of condensing turbine 9, $L_4$ is the output of condensing turbine 22, $G_{f1}$ is the amount of $H_2O$ from the fuel of hydrogen-oxygen combustor 21, and $G_{f2}$ is the amount of $H_2O$ from the fuel of hydrogen-oxygen combustor 8.

TABLE 1

|  | Comparative Example | Example 1 | Example 2 |
|---|---|---|---|
| $L_1$ (G/T output) | 17,460 kw | 17,460 kw | 17,460 kw |
| $L_2$ (B/C expansion turbine output) | 1,230 kw | 1,063 kw | 1,230 kw |

TABLE 1-continued

|  | Comparative Example | Example 1 | Example 2 |
|---|---|---|---|
| $L_3$ (B/C reheating turbine output) | 30,765 kw | 26,577 kw | 30,765 kw |
| $L_4$ (G/T exhaust steam utilizing turbine output) | 0 kw | 3,981 kw | 1,994 kw |
| $L_{total}$ | 49,455 kw | 49,081 kw | 51,449 kw |
| $G_{f1}$ ($H_2O$ from G/T fuel) | 3.58 kg/s | 3.58 kg/s | 3.58 kg/s |
| $G_{f2}$ ($H_2O$ from B/C reheating fuel) | 1.92 kg/s | 1.66 kg/s | 1.92 kg/s |
| $G_{ftotal}$ | 5.50 kg/s | 5.24 kg/s | 5.50 kg/s |
| $\eta_{HHV}$ | 57.1% | 59.5% | 59.4% |

It can be seen from Table 1 that, in the Examples 1 and 2 of the present invention, the plant efficiency $\eta_{HHV}$ (based on the generator output) is enhanced by about 4% as compared with Comparative Example. Moreover, Example 1 is superior to Example 2 because the latter has the disadvantage that highly wet steam will result because saturated steam is expanded in the exhaust steam utilizing turbine.

INDUSTRIAL APPLICABILITY

As described above, the hydrogen-oxygen burning turbine plant of the present invention is useful for industrial purposes in that all of the exhaust heat from the topping cycle can be transferred to the bottoming cycle by converting the topping cycle into a closed loop, thus bringing about an improvement in overall efficiency. Moreover, the hydrogen-oxygen burning turbine plant of the present invention is very useful for industrial purposes in that additional power can be obtained by extracting the steam that is the combustion product of the topping cycle from the closed loop and allowing it to expand in a condensing turbine, thus bringing about a further improvement in overall efficiency.

We claim:

1. A hydrogen-oxygen burning turbine plant using hydrogen as fuel and pure oxygen as oxidizing agent which comprises:

a gas turbine topping cycle including a compressor having an inlet, a hydrogen-oxygen combustor and a turbine having an outlet;

a heat exchanger having an inlet and outlet installed between the turbine outlet and the compressor inlet of said gas turbine topping cycle, and a bottoming cycle including an expansion turbine, a hydrogen-oxygen combustor, a first condensing turbine and a steam condenser, wherein exhaust heat from said gas turbine topping cycle is transferred to said bottoming cycle by means of said heat exchanger, and steam that is the combustion product of said gas turbine topping cycle is extracted at the inlet or outlet of said heat exchanger and conducted to said first condensing turbine or to a second condensing turbine.

* * * * *